Patented July 11, 1933

1,918,212

UNITED STATES PATENT OFFICE

ROBERT PALMER, OF NISKAYUNA, NEW YORK, ASSIGNOR TO GENERAL ELECTRIC COMPANY, A CORPORATION OF NEW YORK

METHOD FOR MAKING HARD METAL COMPOSITIONS

No Drawing. Original application filed October 8, 1930, Serial No. 487,371. Divided and this application filed October 14, 1931. Serial No. 568,878.

This application is a division of my copending application Serial No. 487,371, filed October 8, 1930.

The present invention relates to hard metal compositions and particularly to a method for making hard metal compositions which are suitable for use in electrical apparatus.

It is a specific object of the present invention to provide a method for manufacturing pressure welding electrodes. Other objects of the invention will appear hereinafter.

In carrying out my invention, I impregnate a formed, porous and partly sintered hard metal carbide mass, such as tungsten carbide, with a relatively soft metal which is an electrical conductor and which will wet tungsten carbide, for example copper or an equivalent metal or alloy. Tungsten carbide has no ductility and has a rather low degree of electrical conductivity, whereas in electrical apparatus such as pressure welding tips or rods, it is desirable to have a certain amount of ductility as well as a high degree of electrical conductivity. The addition of copper to the carbide provides the latter with a satisfactory degree of ductility and conductivity. Although copper does not alloy with carbon and only alloys to a slight degree with tungsten, I have found that molten copper will wet tungsten carbide whether the latter is under-saturated or slightly super-saturated with carbon and form a very strong bond with it.

The carbide employed in the present invention should be quite spongy or porous in order to be able to take up a suitable quantity of copper and thereby provide a ductile product having good electrical conductivity. A carbide of this character may be obtained by mixing tungsten carbide in suitable proportions with an agglutinant or adhesive binder material and a liquid as described in the copending application of Louis Navias, Serial No. 319,184, filed November 13, 1928, and entitled "Plastic compositions". The binder material described in the Navias application may be prepared by mixing at room temperature about 50 grams of wheat flour with 300 grams of water and heating the mixture until a pasty gel is formed. To this mass an electrolyte such as ammonia, sodium or potassium hydroxide or acetic acid is added. In the case of ammonia a 25 gram concentrated solution is employed. Although the ammonia is preferred as a stabilizing agent for some purposes as it is volatile and leaves no residue which may combine chemically with the main ingredients, a suitable amount of a 20% sodium hydroxide solution may be employed with satisfactory results when such a combination is not objectionable. About 10% by weight of flour or starch paste, prepared as indicated above, is mixed with about 90% tungsten carbide, and the mixture shaped either by molding or extrusion through a suitable die. The shaped product thus formed is heated or partly sintered in a hydrogen atmosphere at a temperature of about 1100° C. The partial sintering burns out the flour or starch paste binder and at the same time gives the formed carbide a certain degree of rigidity so that it may be handled easily without breakage. Lower temperatures than 1100° C. may be employed if desired but with lower temperatures the heat has to be applied to the product for a longer period of time in order to burn out completely the binder material.

When the binder material has been removed from the carbide the latter is quite porous or spongy and the tungsten carbide particles are partly bonded together by direct contact at their corners or edges. The porous mass is now placed in an open carbon boat containing pieces of copper and heated in a hydrogen atmosphere to a temperature of about 1150° C. to 1250° C. At this temperature, the copper is in a molten condition and runs into the pores of the carbide mass. If sufficient copper is employed the pores will be completely filled and the carbide particles substantially completely bonded by the molten copper.

The amount of copper contained in the finished product may vary considerably. As an example, I have found that satisfactory welding electrodes may be made from a composition consisting of about 20% copper with the remainder tungsten carbide. Such an electrode is strong, solid, a satisfactory electrical conductor, is capable of resisting deformation when subjected to a relatively heavy pressure and has a low contact resistance.

Although my invention has been described in connection with electrical apparatus such as pressure welding electrodes, it is not limited to such use. A tungsten carbide copper composition, besides being a good electrical conductor has also the property of resisting abrasion and may therefore be used as a burnishing wheel if desired. When rubbed over hard steel or softer metal such as brass, the copper impregnated carbide produces a burnished surface on such metals which is uniformly smooth and adapted to receive oil lubrication when employed as a bearing surface. Also, if desired, the hard metal composition may be employed for switch contacts, trolley wheels, contact shoes for trolley wires and steel rolls, bearing boxes and journals and bearing rolls and the like.

Silver wets tungsten carbide in the same manner as copper and, if desired, may be substituted for copper in my improved welding electrode, or in the other uses indicated above. While I ordinarily prefer copper rather than silver as the bonding metal for tungsten carbide, I prefer to employ silver as the bonding metal when the hard metal composition is employed as a switch or regulator contact.

What I claim as new and desire to secure by Letters Patent of the United States, is:

1. The method of manufacturing a metal structure which comprises mixing a hard metal carbide with a starchy binder material, applying pressure to the mixture to thereby shape it, heating the shaped mixture thereby to expel said binder and partly sinter said carbide, thereafter sintering the carbide at a temperature above 1100° C. and impregnating it with a metal which is a good electrical conductor.

2. The method of manufacturing a strong pressure-resisting metal structure which comprises mixing tungsten carbide particles with a starchy binder material, applying pressure to the mixture to thereby shape it, heating the mixture to expel the binder material and form a porous carbide structure, thereafter sintering the carbide at an elevated temperature and impregnating it with a metal which is a good electrical conductor.

3. The method of making a strong pressure-resisting metal structure which comprises mixing pulverized tungsten carbide with an organic binder material, applying pressure to the mixture to thereby shape it, heating the shaped mixture to an elevated temperature to expel said binder and impregnating the carbide with a relatively soft metal which is a good electrical conductor.

4. The method of making a strong, pressure-resisting metal structure which comprises mixing pulverized tungsten carbide with an organic binder material and a liquid, applying pressure to the mixture to thereby shape it, heating the shaped mixture to an elevated temperature to expel the binder material and impregnating the carbide with a relatively soft electrically conducting metal.

5. The method of making a welding rod which comprises mixing particles of tungsten-carbide with an organic binder and a liquid, extruding the mixture, heating the extruded mixture to an elevated temperature to expel the binder material and impregnating the carbide in a hydrogen atmosphere with copper.

6. The method of making a pressure welding electrode which comprises mixing finely divided tungsten carbide with a starchy binder material, applying pressure to the mixture to thereby shape it, heating the shaped material to thereby expel said binder and provide a porous structure, and impregnating said porous structure with molten copper.

In witness whereof, I have hereunto set my hand.

ROBERT PALMER.